(12) United States Patent
Hori et al.

(10) Patent No.: US 6,510,916 B2
(45) Date of Patent: Jan. 28, 2003

(54) FOUR-WHEEL VEHICLE FOR TRAVELING ON IRREGULAR ROAD

(75) Inventors: Yoshiaki Hori; Takashi Shichinohe; Hiroshi Ohri, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/842,034

(22) Filed: Apr. 26, 2001

(65) Prior Publication Data

US 2002/0003058 A1 Jan. 10, 2002

(30) Foreign Application Priority Data

Apr. 26, 2000  (JP) .......................................... 2000-125284

(51) Int. Cl.⁷ .......................... B60K 17/00; B60K 17/22
(52) U.S. Cl. ....................................... 180/374; 180/376
(58) Field of Search ................................. 180/374, 376, 180/292, 233

(56) References Cited

U.S. PATENT DOCUMENTS

| | | | | |
|---|---|---|---|---|
| 3,748,928 A | * | 7/1973 | Shiber | 74/711 |
| 5,004,064 A | * | 4/1991 | Tezuka et al. | 180/247 |
| 5,205,373 A | * | 4/1993 | Kadokura et al. | 180/248 |
| 5,431,603 A | * | 7/1995 | Aho | 475/84 |
| 5,628,705 A | * | 5/1997 | Kashiwabara | 477/46 |
| 5,827,145 A | * | 10/1998 | Okcuoglu | 475/88 |
| 6,155,371 A | * | 12/2000 | Izumi | 180/374 |
| 6,170,567 B1 | * | 1/2001 | Fukuda | 180/376 |
| 6,269,899 B1 | * | 8/2001 | Izumi | 180/376 |

FOREIGN PATENT DOCUMENTS

| | | |
|---|---|---|
| JP | U63104117 | 7/1988 |
| JP | Y256181 | 2/1993 |
| JP | Y2723285 | 5/1995 |

* cited by examiner

*Primary Examiner*—Paul N. Dickson
*Assistant Examiner*—Matthew Luby
(74) *Attorney, Agent, or Firm*—Birch, Stewart, Kolasch & Birch, LLP

(57) ABSTRACT

To provide a four-wheel vehicle for traveling on an irregular road superior in weight balance and traveling stability. A center line (L3) of a rotational axis of a torque converter and a longitudinal center line (L2) of a drive shaft or a propeller shaft, which transmits a driving force from a transmission mechanism M to front or rear wheels, are distributed right and left in an opposed relation to each other with respect to a longitudinal center line (L1) of a vehicle body.

13 Claims, 12 Drawing Sheets

FOUR-WHEEL VEHICLE FOR TRAVELING ON IRREGULAR ROAD

BACKGROUND OF THE INVENTION

1. Field of the Invention

The present invention relates to a four-wheel vehicle for traveling on an irregular road, such as a saddle type four-wheel buggy.

2. Description of Background Art

As proposed in Japanese Utility Model Laid-open No. Sho 63-104117 or Publication No. Hei 5-6181 or Hei 7-23285, a vehicle for traveling on an irregular road such as a muddy, damp, sandy, snowy, or gravel road, a four-wheel vehicle may be equipped with balloon tires of a low pressure.

In such a four-wheel vehicle for traveling on an irregular road, a driving force from an engine is inputted to a multi-stage transmission through a clutch, a drive shaft is rotated with the driving force provided from the multi-stage transmission, the rotation of the driving shaft is transmitted through a propeller shaft and a differential gear to right and left driving shafts disposed transversely, and right and left front wheels (rear wheels) are rotated with rotation of the right and left driving shafts.

The differential gear generally comprises a ring gear, a pair of right and left side gears, and a pair of pinions located between the side gears and meshing with the side gears. The rotation of the propeller shaft is transmitted to the ring gear, one side gear is rotated by rotation of the ring gear, and the rotation of the one side gear is transmitted to the other side gear through a pinion. First ends of driving shafts are connected respectively through constant velocity joints to shaft portions extending outwards of the right and left side gears and the opposite ends (outer ends) of the driving shafts are connected respectively to wheels also through constant velocity joints.

As described above in connection with the conventional structure, driving shafts for the transmission of a driving force are disposed between the differential gear and the right and left front wheels, and if the driving shafts are independent suspension type driving shafts, they are connected to the differential gear through constant velocity joints so as to be swingable around their connections to the differential gear.

In order that the vehicle can travel stably, it is not desirable for the right and left wheels to have different vertical swing ranges. In this connection, making the right and left driving shafts equal in length is a precondition for ensuring a high traveling stability.

If the right and left driving shafts are made equal in length, the center of the differential gear comes to be positioned approximately on the center line of the vehicle body. Of course, if the shaft portion of one of the paired side gears which constitute the differential gear is made longer, the differential gear can be biased to either the right or the left while keeping both driving shafts equal in length. However, from the standpoint of weight balance, it is desirable that the center of the differential gear and that of the vehicle body are substantially coincident with each other.

If the differential gear is disposed substantially in alignment with the center of the vehicle body, the ring gear as a constituent of the differential gear is displaced to either the right or the left, and the propeller shaft having a gear on one end thereof which gear is in mesh with the ring gear and the drive shaft which transmits a driving force to the propeller shaft are also displaced to either the right or the left, resulting in promotion of an unbalanced state.

For remedying this unbalance in the conventional four-wheel vehicle not provided with a torque converter, the differential gear is disposed in a biased state to either the right or the left, as noted earlier, and a propeller shaft and a drive shaft are disposed on the opposite side. In this case, however, the structure of the differential gear becomes complicated; for example, the shaft portions of the right and left side gears are made different in length.

SUMMARY AND OBJECTS OF THE INVENTION

For solving the above-mentioned problems, according to the present invention there is provided a four-wheel vehicle for traveling on an irregular road wherein a driving force of an engine is transmitted to front or rear wheels, characterized in that a torque converter is provided in a power transfer path extending from a crank shaft of the engine up to an input shaft of a transmission, and a center line of a rotational axis of the torque converter and a longitudinal center line of a drive shaft which transmits the driving force from the transmission to the front or rear wheel are positioned right and left in an opposed relation to each other with respect to a longitudinal center line of a body of the vehicle.

According to the above construction, the torque converter and the drive shaft, which are heavy components, are distributed right and left. Consequently, the vehicle is weight-balanced and its traveling stability is enhanced.

Further, if the differential gear, which is also a heavy component, is disposed centrally of the vehicle body, the vehicle is more weight-balanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will be described hereinunder with reference to the accompanying drawings.

Figure 1:
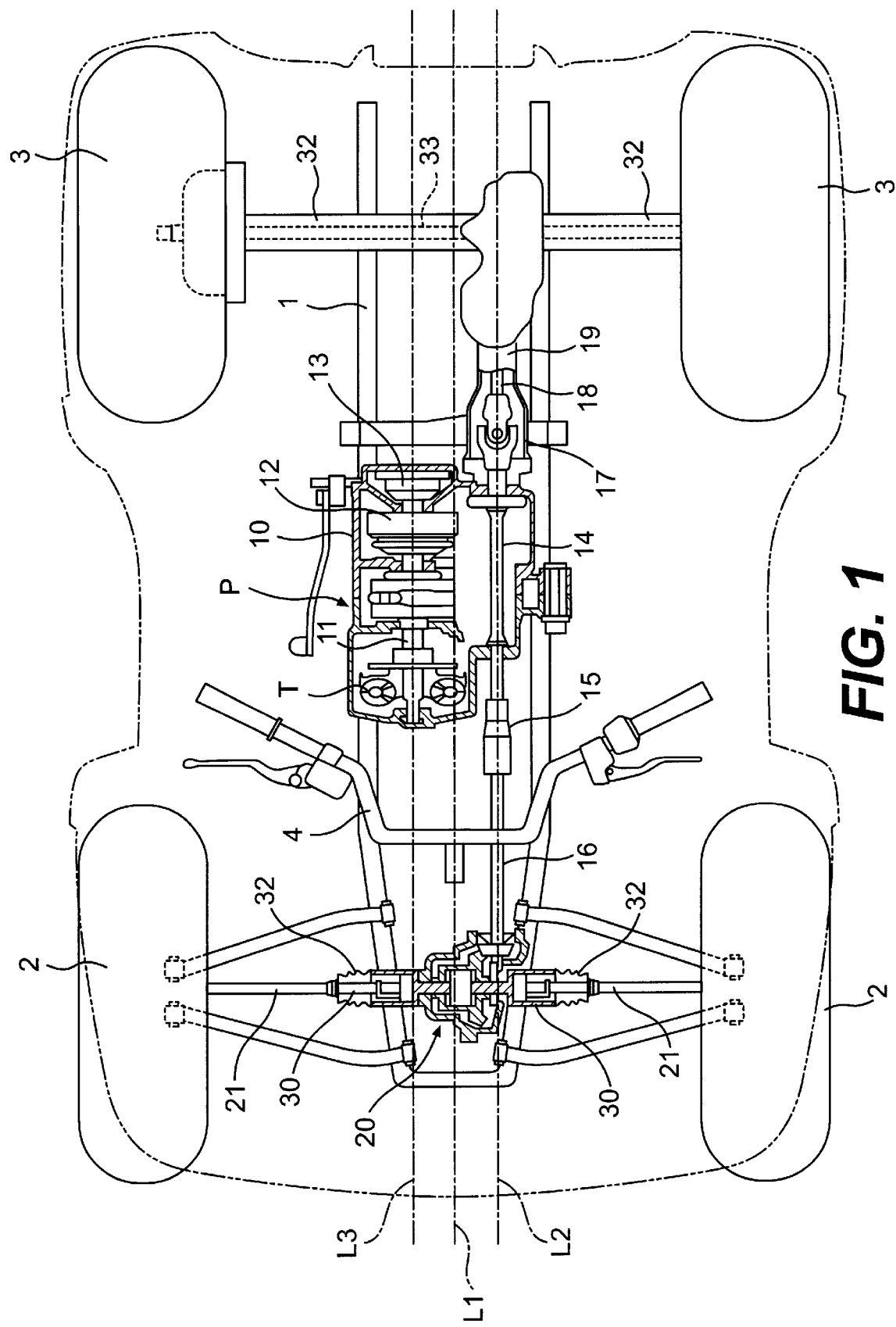
FIG. 1 is a plan view showing a four-wheel vehicle for traveling on an irregular road according to the present invention, with only front wheels being independent suspension type wheels.

The four-wheel vehicle for traveling on an irregular road illustrated in FIG. 1 is a saddle type four-wheel buggy. In this four-wheel buggy, a pair of right and left front wheels 2 serving as both steering wheels and driving wheels are suspended each independently in a front portion of a body frame 1 constituted by welding pipes, while a pair of right and left rear wheels 3 serving as driving wheels are integrally suspended in a rear portion of the body frame 1. The front and rear wheels 2, 3 use a low-pressure balloon tire not higher than 0.25 kg/cm$^2$ in grounding surface pressure.

Figure 2:
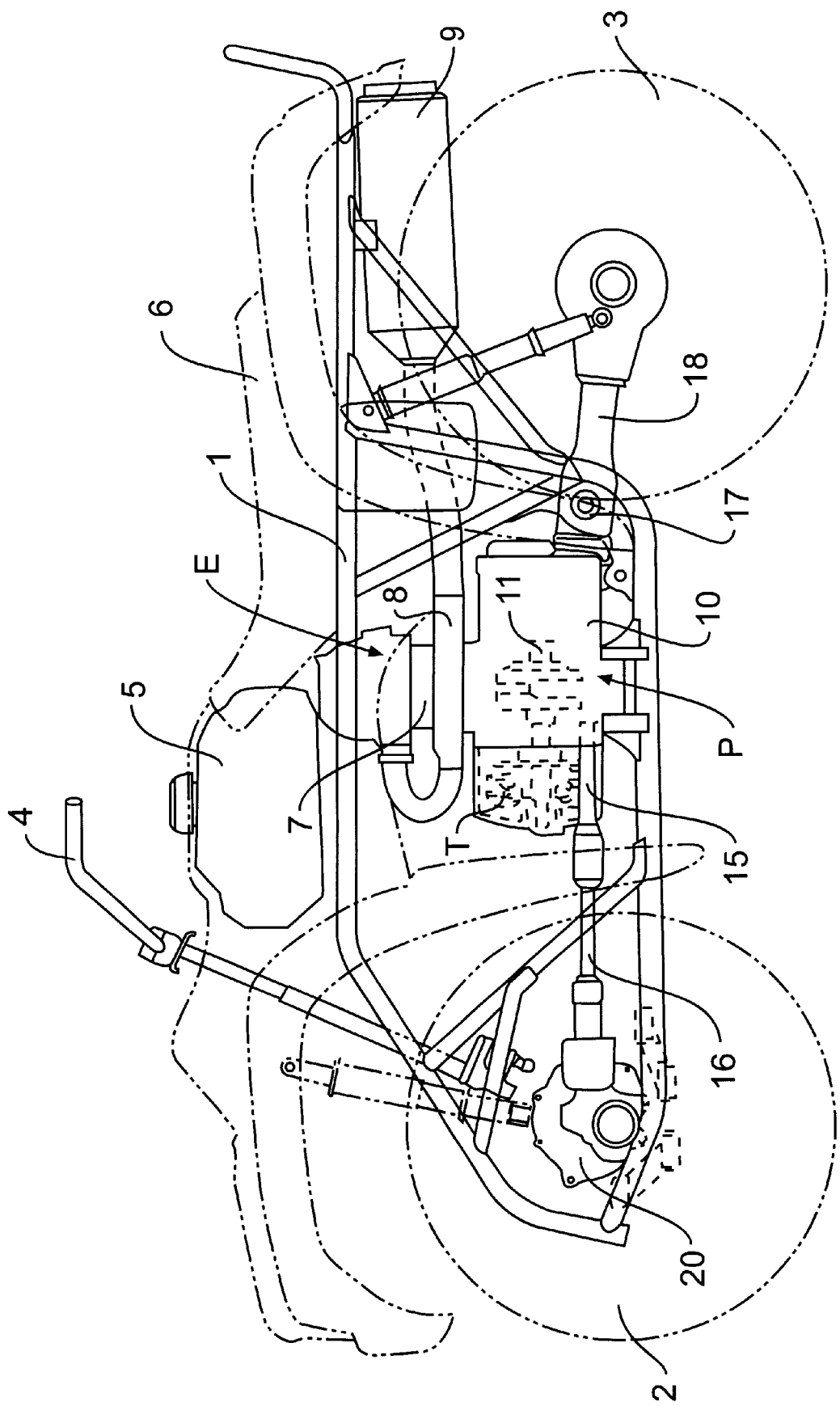
FIG. 2 is a side view showing the four-wheel vehicle for traveling on an irregular road as illustrated in FIG. 1.

At a front end of the body frame 1 is disposed a handle bar 4 for steering the front wheels. As shown in FIG. 2, a fuel tank 5 is mounted at a longitudinally intermediate portion of the body frame 1, a straddling type seat 6 is disposed on the body frame 1 behind the fuel tank 5, and a power unit P including an engine E, a torque converter T and a transmission mechanism M is mounted below the seat 6 and the fuel tank 5.

One end of an exhaust pipe 8 is connected to an exhaust port formed on a front side of a cylinder head of the engine E, while the opposite end of the exhaust pipe 8 extends sideways of the power unit P and is connected to a muffler 9 disposed sideways of a rear portion of the vehicle body. An intake system is connected to a rear side of the cylinder head.

A crank case 10 underlies the engine E and a crank shaft 11 is supported rotatably within the crank case 10. One end of the crank shaft 11 is connected to a pump impeller of the torque converter T, while the opposite end of the crank shaft is connected to a generator 12, and a recoil starter 13 is disposed outside the generator 12.

A driving force from the torque converter T is transmitted to a drive shaft 14 through the transmission mechanism M which will be described later. A front end portion of the drive shaft 14 is connected to a propeller shaft 16 for the front wheels through a constant velocity joint 15, while a rear end portion of the drive shaft 14 is connected to a propeller shaft 18 for the rear wheels through a constant velocity joint 17. The propeller shaft 18 for the rear wheels is received within a swing arm 19.

Rotation of the propeller shaft 16 for front wheels is transmitted to the right and left driving shafts 21 through a differential gear 20 and the rotation of the driving shafts 21 is transmitted to the front wheels 2 through constant velocity joints (not shown).

Figure 3:
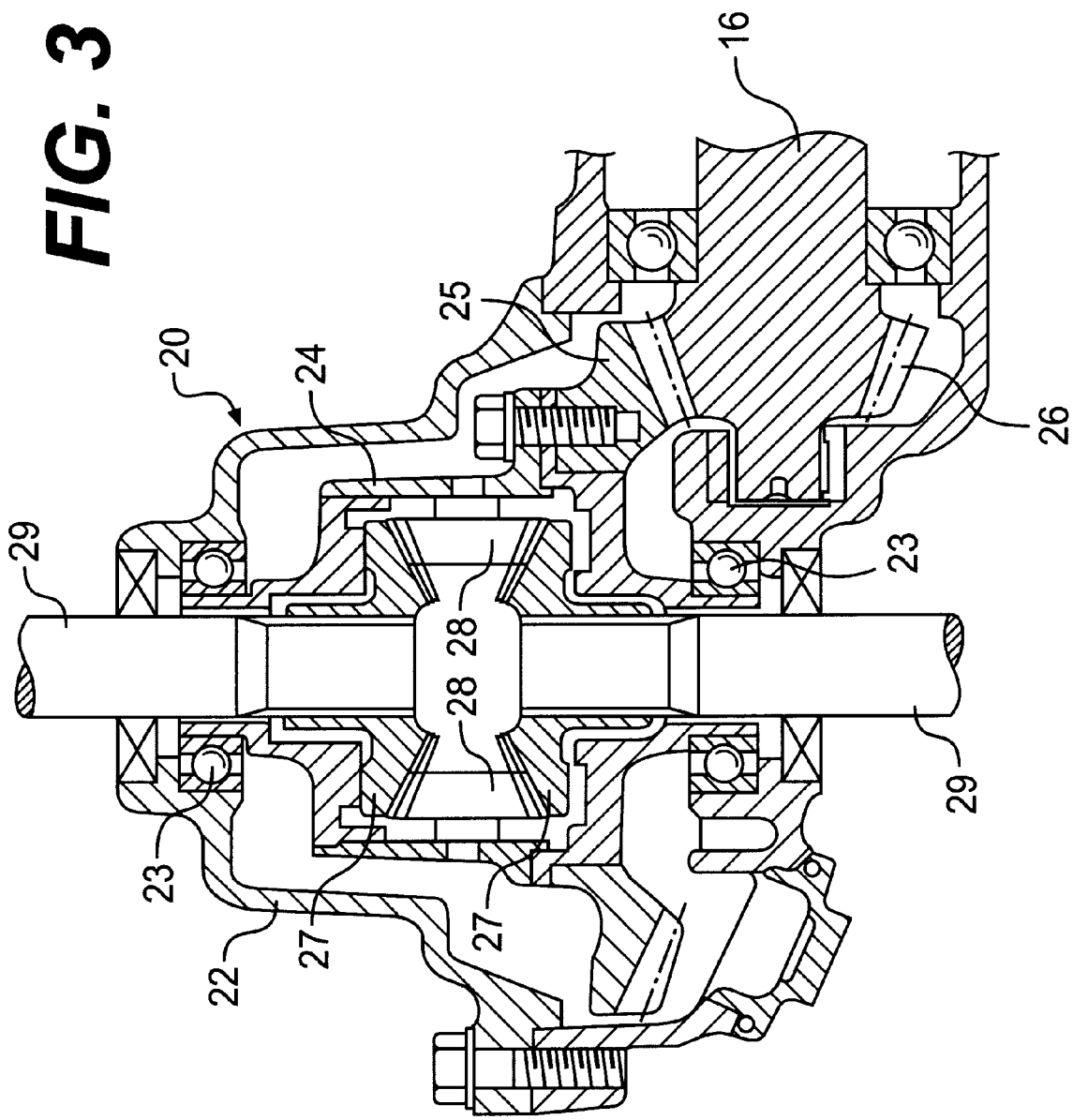
FIG. 3 is an enlarged sectional view of a differential gear and the vicinity thereof in the four-wheel vehicle for traveling on an irregular road shown in FIG. 1.

The differential gear 20 has such a structure as shown in FIG. 3. As illustrated in FIG. 3, a box 24 is mounted within a case 22 rotatably through ball bearings 23, a ring gear 25 is secured to the box 24, a pinion gear 26 formed on a front end portion of the propeller shaft 16 for the front wheels is brought into mesh with the ring gear 25, and rotation of the ring gear 25 is transmitted to one of the right and left side gears 27. Further, the rotation of the one side gear is transmitted to the other side gear 27 via pinion gears 28 mounted between and meshing with the right and left side gears 27, causing shafts 29 to rotate. The shafts 29 are splined respectively to central holes formed in the side gears 27.

The right and left shafts 29 and the right and left driving shafts 21 are respectively connected through constant velocity joints 30 and each of the connections is covered with a bellows cover 31.

Side members 32 formed by pipes are provided at a rear end portion of the swing arm 19 which receives therein the propeller shaft 18 for the rear wheels, and driving shafts 33 for rotating the rear wheels 3 are received respectively within the side members 32.

Figure 4:
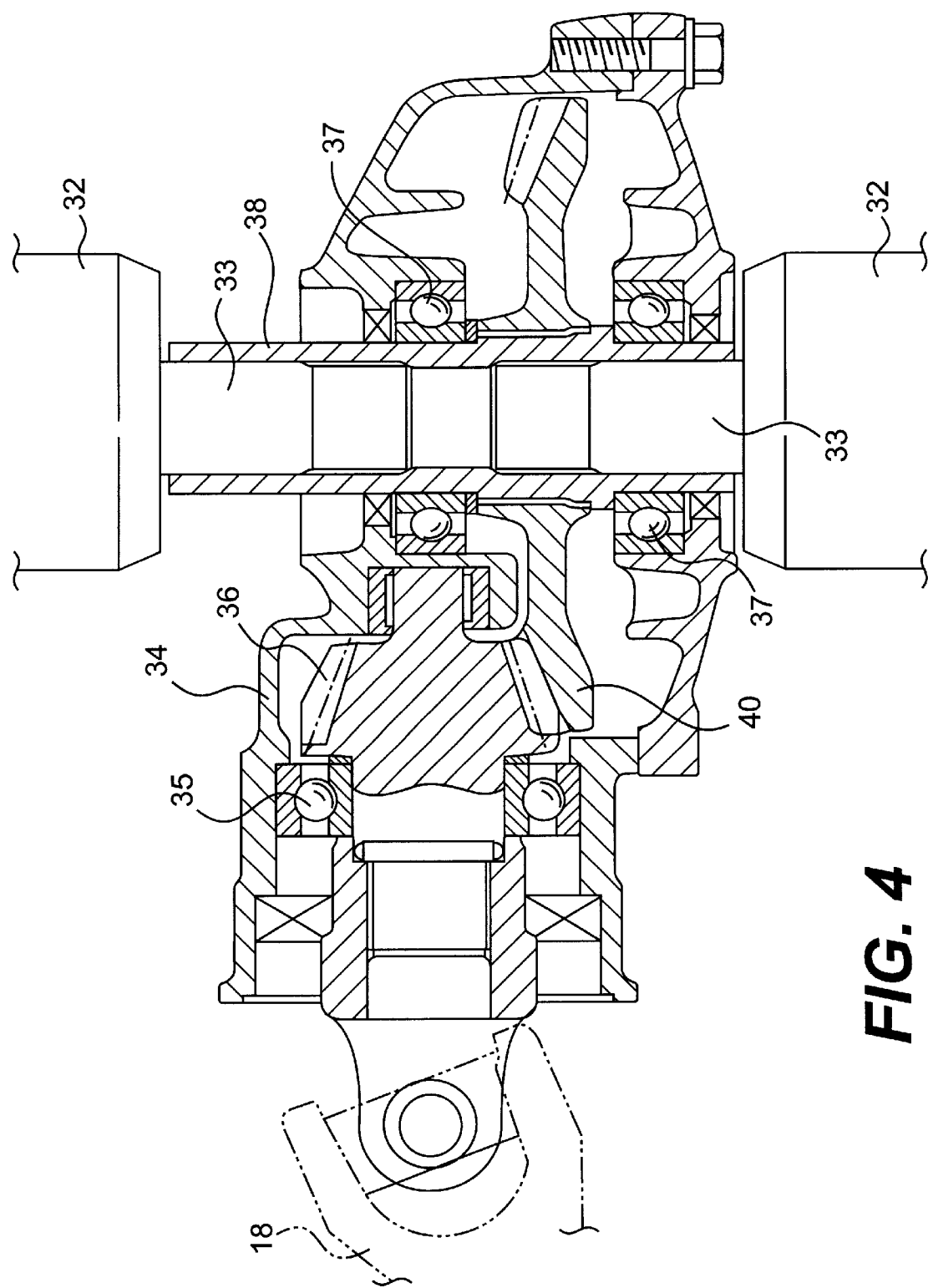
FIG. 4 is an enlarged sectional view of a connection between a propeller shaft for rear wheels and rear wheel driving shafts in the four-wheel vehicle shown in FIG. 1.

FIG. 4 illustrates a structure for transmitting a driving force to each of the driving shafts 33. As shown in FIG. 4, a case 34 is provided at the rear end portion of the swing arm 19, and within the case 34 is disposed a pinion 36 through a ball bearing 35. Also disposed within the case 34 is a cylindrical member 38 supported through ball bearings 37 both rotatably so as to have respective rotational axes 90° different from each other. The driving force from the propeller shaft 18 for the rear wheels is transmitted to the pinion 36 through a constant velocity joint 39.

The driving shafts 33 are splined to the inside of the cylindrical member 38 so as to be adjustable in their axial length, while a ring gear 40 is splined to the outside of the cylindrical member 38, and the pinion 36 is brought into mesh with the ring gear 40. After all, the driving force from the propeller shaft 18 for the rear wheels is transmitted to the rear wheels 3.

As shown in FIG. 1, the differential gear 20 is disposed so that the center thereof is substantially aligned with a longitudinal center line (L1) of the vehicle body, a center line (L2) extending in the longitudinal direction of the drive shaft 14 (propeller shafts 16 and 18) is positioned on the left-hand side of the vehicle body and in parallel with the longitudinal center line (L1) of the vehicle body, and a center line (L3) of a rotational axis of the torque converter T is positioned on the right-hand side of the vehicle body and in parallel with the longitudinal center line (L1) of the vehicle body.

Thus, since the center line (L3) of the rotational axis of the torque converter and the longitudinal center line (L2) of the drive shaft or the propeller shaft which transmits the driving force from the transmission mechanism M to the front or rear wheels are distributed right and left in an opposed relation to each other with respect to the longitudinal center line (L1) of the vehicle body, it becomes possible to improve the weight balance.

Figure 5:
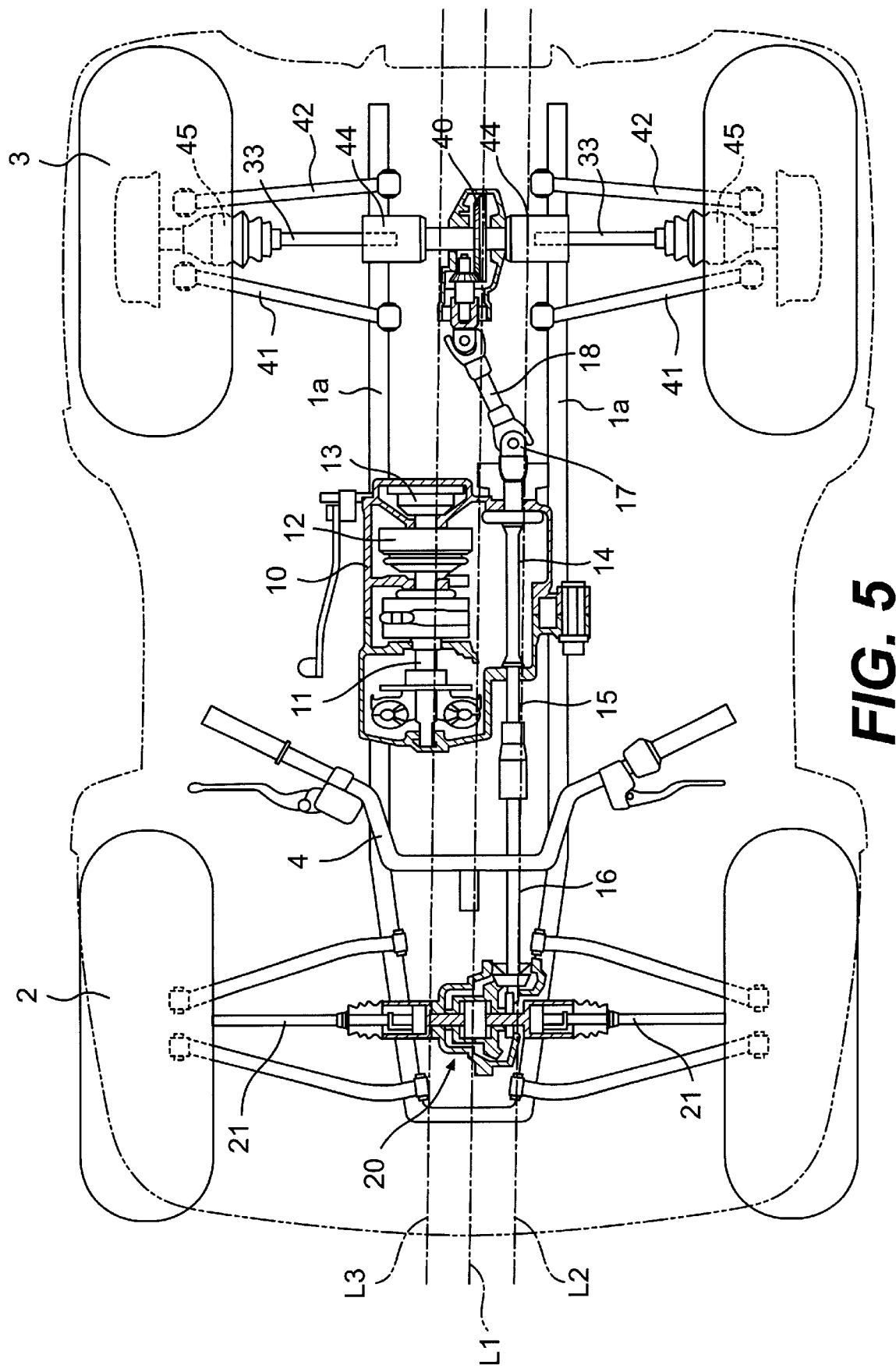
FIG. 5 is a plan view showing a four-wheel vehicle for traveling on an irregular road according to the present invention, with both front and rear wheels being independent suspension type wheels.
Figure 6:
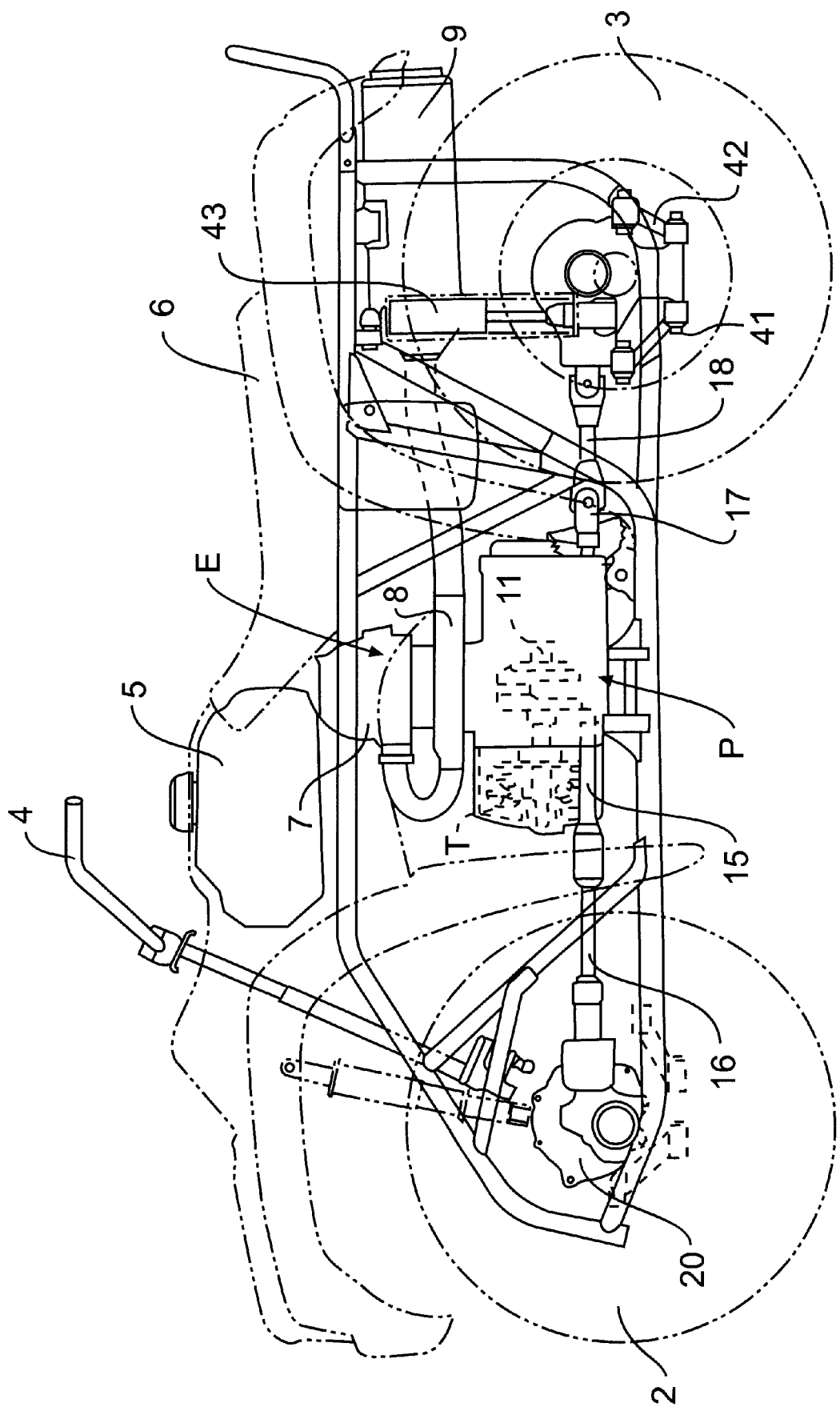
FIG. 6 is a side view showing the four-wheel vehicle for traveling on an irregular road as illustrated in FIG. 5.

FIG. 5 is a plan view showing a four-wheel vehicle for traveling on an irregular road according to the present invention, with both front and rear wheels being independent suspension type wheels, and FIG. 6 is a side view thereof. In connection with FIGS. 5 and 6, the same components as in the previous embodiment will be identified by the same reference numerals as in the previous embodiment and explanations thereof will here be omitted.

In this embodiment, first ends of arms 41 and 42 are supported swingably by right and left rails 1a which constitute a rear portion of a body frame 1, and tip ends of the arms 41 and 42 are connected to rear wheels 3. Further, a shock absorber 43 is disposed between each rear wheel 3 and the body frame 1 so that the right and left rear wheels 3 are adapted to swing each independently (independent suspension). The transfer of a driving force to driving shafts 33 and the transfer of the driving force from the driving shafts 33 to the rear wheels 3 are performed through constant velocity joints 44 and 45.

Also in this embodiment, a center line (L3) of a rotational axis of a torque converter T and a longitudinal center line (L2) of a drive shaft 14 are distributed right and left in an opposed relation to each other with respect to a longitudinal center line (L1) of the vehicle body.

The structure of the power unit P and a hydraulic control for the power unit will be described below with reference to FIGS. 7 to 11.

First, in the crank case 10 of the engine E, the cylinder block 7 is disposed vertically, a piston 52 is fitted inside the cylinder block 7 slidably through a sleeve 51, and a carburetor 54 and a connecting tube 55 are connected to a cylinder head 53 formed on the cylinder block 7.

The crank shaft 11 is supported within the crank case 10 rotatably through a pair of bearings 57 and is connected to the piston 52 through a connecting rod 58.

The crank shaft 11 is disposed in parallel with the vehicular longitudinal direction, a portion of the crank shaft 11 projecting forwardly (leftwards in FIG. 7) from the crank case 10 is received within a front cover 59 and a front end portion thereof is supported rotatably by means of a ball bearing 60, while a portion of the crank shaft 11 projecting backwardly (rightwards in FIG. 7) from the crank case 10 is received within a rear cover 61.

A rotor 63 of the generator 12 is mounted on the crank shaft 11 at a position which faces the inside of the rear cover 61, a stator 64 disposed inside the rotor 63 is fixed to the rear cover 61, and the recoil starter 13 is mounted to a rear end of the crank shaft 11.

The torque converter T, which is disposed inside the front cover 59, comprises a pump impeller 65, a turbine runner 66 and a stator impeller 67, and the interior thereof is filled with oil.

The pump impeller 65 rotates integrally with the crank shaft 11, while the turbine runner 66 is disposed face to face with the pump impeller 65 and is fixed to a turbine shaft which is disposed rotatably and coaxially with respect to the crank shaft 11. The turbine shaft and the pump impeller 65 are connected together through a one-way clutch. The rotation of the pump impeller 65 is transmitted to the turbine runner 66 through the inside oil and power is transmitted to the transmission mechanism M through a primary gear and a clutch.

A stator shaft of the stator impeller 67 is rotatable about a support member which is fixed to the crank case through a one-way clutch. The stator impeller 67 does not rotate when there is a great difference between the rotation of the pump impeller 65 and that of the turbine runner 66. A torque reaction force to the stator impeller 67 is amplified by smoothing the flow of oil from the turbine runner 66. On the other hand, when the difference in rotation between the pump impeller 65 and the turbine runner 66 is small, the stator impeller 67 idles so as not to act as resistance.

The transmission mechanism M is received within a transmission case 70 formed integrally with the crank case 10 and an input shaft 71 parallel to the crank shaft 11 is supported rotatably by the transmission case 70 through ball bearings 72. Likewise, an output shaft 73 parallel to the crank shaft 11 is supported rotatably by the transmission case 70 through ball bearings 74.

A clutch 80 is mounted on one end (torque converter side) of the input shaft 71. The clutch 80 is located between the torque converter T and the crank case 10 in such a manner that a portion thereof overlaps the torque converter when looking in the vehicular longitudinal direction, thereby attaining an effective utilization of space.

The clutch 80 comprises a clutch center 81 which is rotatable about the input shaft 71, a driven gear 83 connected to the clutch center 81 through a buffer spring 82 and meshing with a driving gear 69 in the torque converter T, a plurality of first clutch discs 84 engaged with an outer periphery of the clutch center 81 so as to be incapable of relative rotation, a plurality of second clutch discs 85 disposed in a lapped state between the plural first clutch discs 84, a clutch drum 86 which receives the first and second clutch discs 84, 85 therein and which rotates integrally with the input shaft 71 while allowing an outer periphery of the second clutch discs 85 to be engaged therewith in a relatively rotatable infeasible manner, and a piston 87 slidably fitted within the clutch drum 86.

An oil chamber 88 is formed between the piston 87 and the inside of the clutch drum 86, and a spring 89 is disposed for the piston 87 on the side opposite to the oil chamber 88 to urge the piston in a diminishing direction of the oil chamber 88.

An oil passage 76 is formed axially in the input shaft 71. The oil passage 76 and the oil chamber 88 are communicated with each other through an oil passage 77. Further, oil is fed to the oil passage 76 through a pipe 78 which extends through the front cover 59.

When oil is fed into the oil chamber 88 through the pipe 78, and the oil passages 76 and 77, the piston 87 moves against the spring 89, causing the first and second clutch discs 84, 85 to come into pressure contact with each other and causing the clutch 80 to turn ON, thereby allowing the power from the torque converter T to be transmitted to the input shaft 71.

Conversely, upon discharge of oil from the oil chamber 88, the piston 87 moves in the reverse direction and the first and second clutch discs 84, 85 move away from each other, thus turning OFF the clutch 80.

In this embodiment, the turning ON-OFF of the clutch 80 is performed in accordance with signals provided from an idling sensor and a gear shift operation sensor. More specifically, during idling of the engine or when a gear shift operation is performed, the clutch 80 is turned OFF to block the transfer of power from the torque converter T to the input shaft 71.

By so doing, it is possible to eliminate a creep phenomenon during idling and diminish the resistance during a gear shift operation.

Driving gears 91, 92 and 93 are mounted on the input shaft 71 integrally with the input shaft or separately from the input shaft but integrally rotatably with the input shaft. Driven gears 101, 102, 103 and 104 are mounted on the output shaft 73 rotatably. The driving gear 91 and the driven gear 101 are in mesh with each other and conjointly constitute a low-shift gear train. Likewise, the driving gear 92 and the driven gear 102 are in mesh with each other and conjointly constitute a 2nd-shift gear train, the driving gear 93 and the driven gear 103 are in mesh with each other and conjointly constitute a 3rd-shift gear train. Further, a counter shaft (not shown) is present between the input shaft 71 and the output shaft 73, and the driving gear 91 and the driven gear 104 are in mesh with each other through an intermediate gear mounted on the counter shaft. The driving gear 91, the intermediate gear and the driven gear 104 constitute a reverse-shift gear train.

Dog clutches 105 and 106 are splined onto the output shaft 73 so as to be rotatable integrally with the output shaft 73 and movable axially. The dog clutches 105 and 106 are brought into engagement with any of the driven shafts 101, 102, 103 and 104 in an alternative manner by means of a shift fork which will be described later, whereby there is established a low-, 2nd-, 3rd- or reverse-shift gear train.

When the dog clutches 105 and 106 are not engaged with any of the driven gears, this state is a neutral state.

In parallel with the output shaft 73 the drive shaft 14 is supported by the transmission case 70 rotatably through ball bearings 111 and 112, and a driving gear 107 mounted on the output shaft 73 and a driven gear 113 mounted on the drive shaft 14 are in mesh with each other. Therefore, the drive shaft 14 is rotated at a gear ratio and in a rotational direction both corresponding to the established gear train. This rotative driving force is transmitted to the front and rear wheels 2, 3 through propeller shafts.

Within the transmission case 70 is disposed a shaft 120 in parallel with the output shaft 73, and shift forks 121 and 122 are slidably provided on the shaft 120.

Although in the drawings the dog clutches 105, 106 and the shift forks 121, 122 are spaced away from each other for avoiding complication of lines, actually the dog clutch 105 and the shift fork 121 are engaged with each other, while the dog clutch 106 and the shift fork 122 are engaged with each other.

Base end portions of the shift forks 121 and 122 are engaged with cam grooves 124 and 125 formed in a shift drum 123 which is disposed in parallel with the shaft 120. The shift drum 123 is rotated by transmitting thereto the rotation of a shift spindle 126 through a sector gear 127 and a driven gear 128.

The shift spindle 126 is rotated by transmitting thereto the rotation of an electric motor (not shown) through a reduction gear train. A shift position is determined in accordance with the amount of rotation of the shift drum 123 and therefore a sensor 129 for detecting the shift position is attached to a rear end of the shift drum 123.

Figure 10:
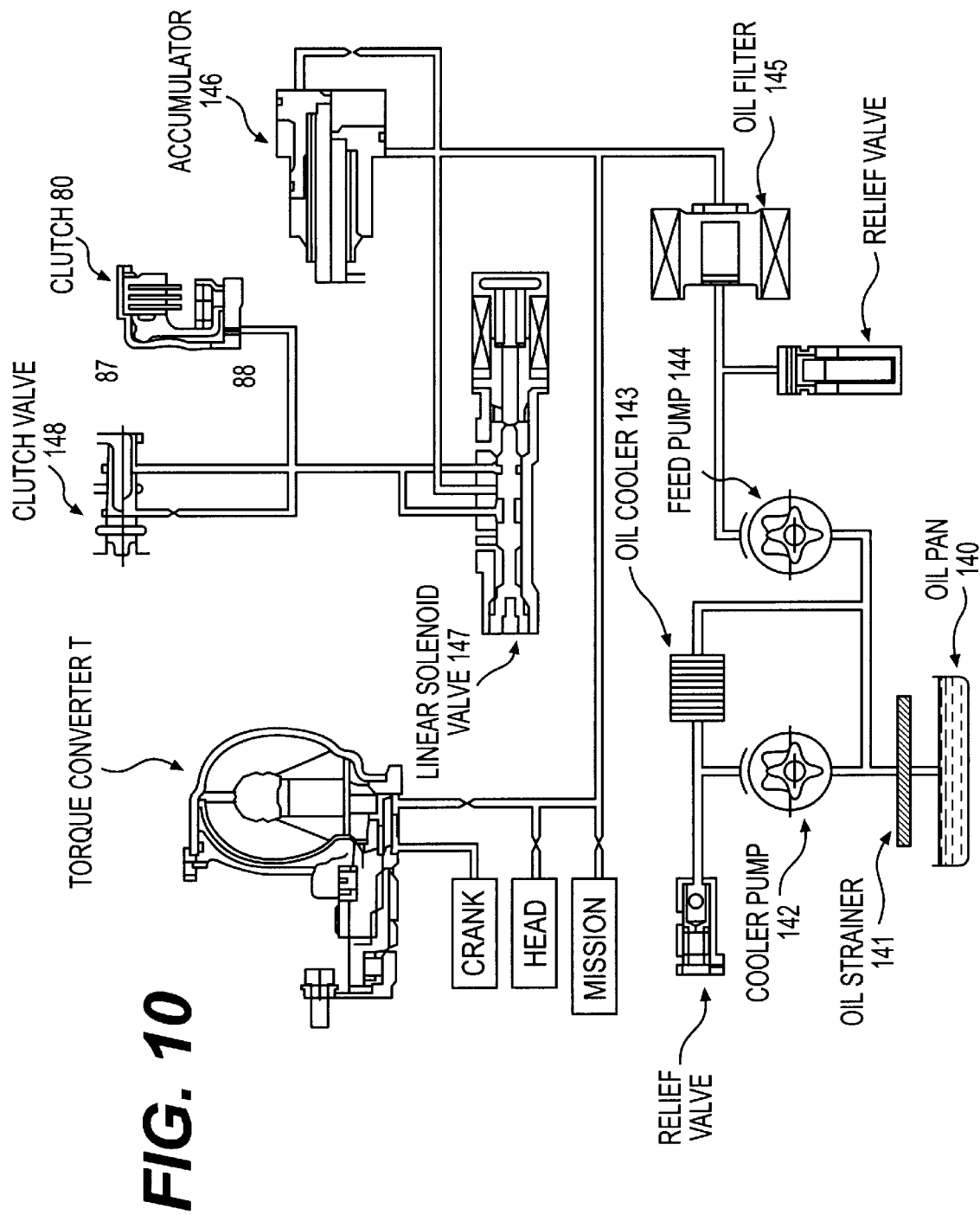
FIG. 10 illustrates a hydraulic control circuit for the power unit shown in FIGS. 7 to 9.

FIG. 10 illustrates an example of a hydraulic control circuit for the power unit P. In this example, oil is used not only as a hydraulic operating oil for the torque converter T and the clutch 80 but also as a lubricating oil to be fed to the crank shaft 11, cylinder head 53 and transmission mechanism M.

Oil present within an oil pan 140 is sucked by a cooler pump 142 through an oil strainer 141, then is cooled by an oil cooler 143 and is again returned into the oil pan 140.

Also, the oil in the oil pan 140 is sucked by a feed pump 144 through the oil strainer 141 and is fed to a linear solenoid valve 147 through an oil filter 145 and an accumulator 146. By operating the linear solenoid valve 147 the oil is fed to the oil chamber 88 formed in the clutch 80, causing the piston 87 to move to the right in FIG. 10, thereby causing the first and second clutch discs to come into pressure contact with each other to turn ON the clutch 80.

As a result of the clutch 80 having been turned ON, the driving force from the torque converter T is transmitted to the transmission mechanism M, as noted earlier.

The oil present in the oil chamber 88 is discharged by operating a clutch valve 148, resulting in the clutch 80 being turning OFF.

A portion of the oil which has passed through the oil filter 145 is fed as a lubricating oil to both the cylinder head 53 and the transmission mechanism M, while the remaining oil is fed as a hydraulic operating oil to the torque converter T. Further, the oil flowing out of the torque converter T is fed as a lubricating oil to the crank shaft 11.

The oil after use as a lubricating oil or a hydraulic operating oil is again collected into the oil pan 140.

Figure 11:
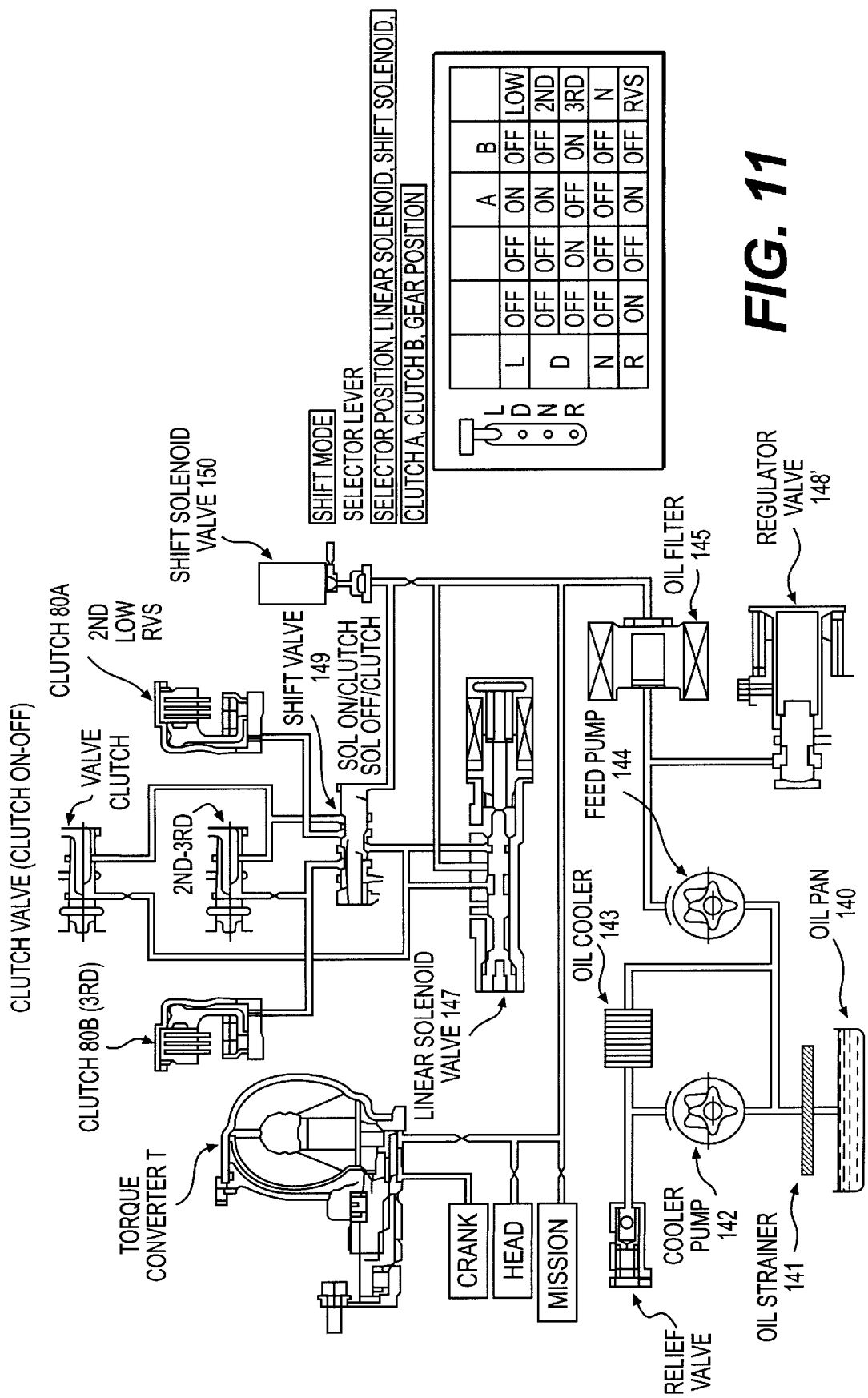
FIG. 11 illustrates another example of a hydraulic control circuit.

FIG. 11 illustrates another example of a hydraulic control circuit. In this example, a clutch is divided into two, that is, a clutch 80A and a clutch 80B. By turning ON the clutch 80A it becomes possible to select any one of the Low gear, 2nd gear and reverse (Rvs) gear, and by turning ON the clutch 80B it becomes possible to select the 3rd gear.

In this example, between the feed pump 144 and the oil filter 145, a relief valve is not provided, but a regulator valve 148' is provided. Further, a shift valve 149 is disposed downstream of the linear solenoid valve 147, and by operating the shift valve 149 with use of a shift solenoid valve 150, oil is fed to either the clutch 80A or the clutch 80B selectively.

In the example illustrated in FIG. 11, as shown in the table of Shift Mode, if a selector lever is shifted to the L range, the linear solenoid valve 147 turns ON, the shift solenoid valve 150 turns OFF, and the clutches 80A and 80B turn ON and OFF, respectively, to establish the Low gear.

If the selector lever is shifted to the D range, the linear solenoid valve 147 turns OFF, the shift solenoid valve 150 turns OFF, and the clutches 80A and 80B turn ON and OFF, respectively, to establish the 2nd gear.

When the shift solenoid valve 150 turns ON and the clutches 80A and 80B turn OFF and ON, respectively, in accordance with a command provided from a speed sensor, there is established the 3rd gear.

If the selector lever is shifted to the N range, all of the linear solenoid valve 147, shift solenoid valve 150 and clutches 80A and 80B turn OFF and the neutral position is established.

Further, if the selector lever is shifted to the R range, the linear solenoid valve 147 turns ON, the shift solenoid valve 150 turns OFF and the clutches 80A and 80B turn ON and OFF, respectively, to establish the Rvs position.

In the above operations, both clutches 80A and 80B are turned OFF in the neutral state to avoid the occurrence of a creep phenomenon, and also at the time of a gear shift operation the clutches are turned OFF to prevent a friction induced by a transfer torque from being exerted on a switching slide portion of the transmission, thereby diminishing the switching resistance of the transmission.

Figure 7:
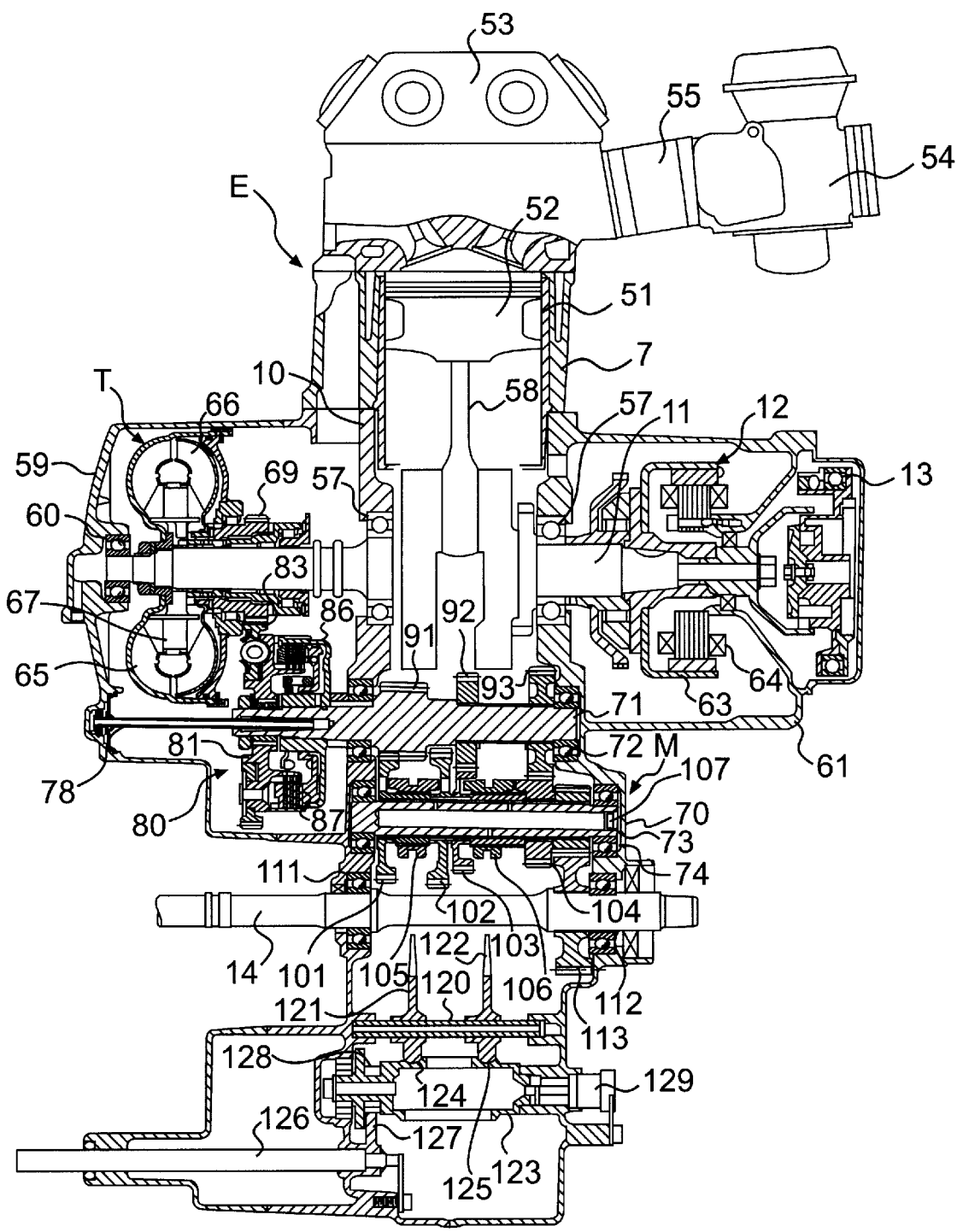
FIG. 7 is a sectional view of a power unit mounted on a four-wheel vehicle for traveling on an irregular road according to the present invention.
Figure 8:
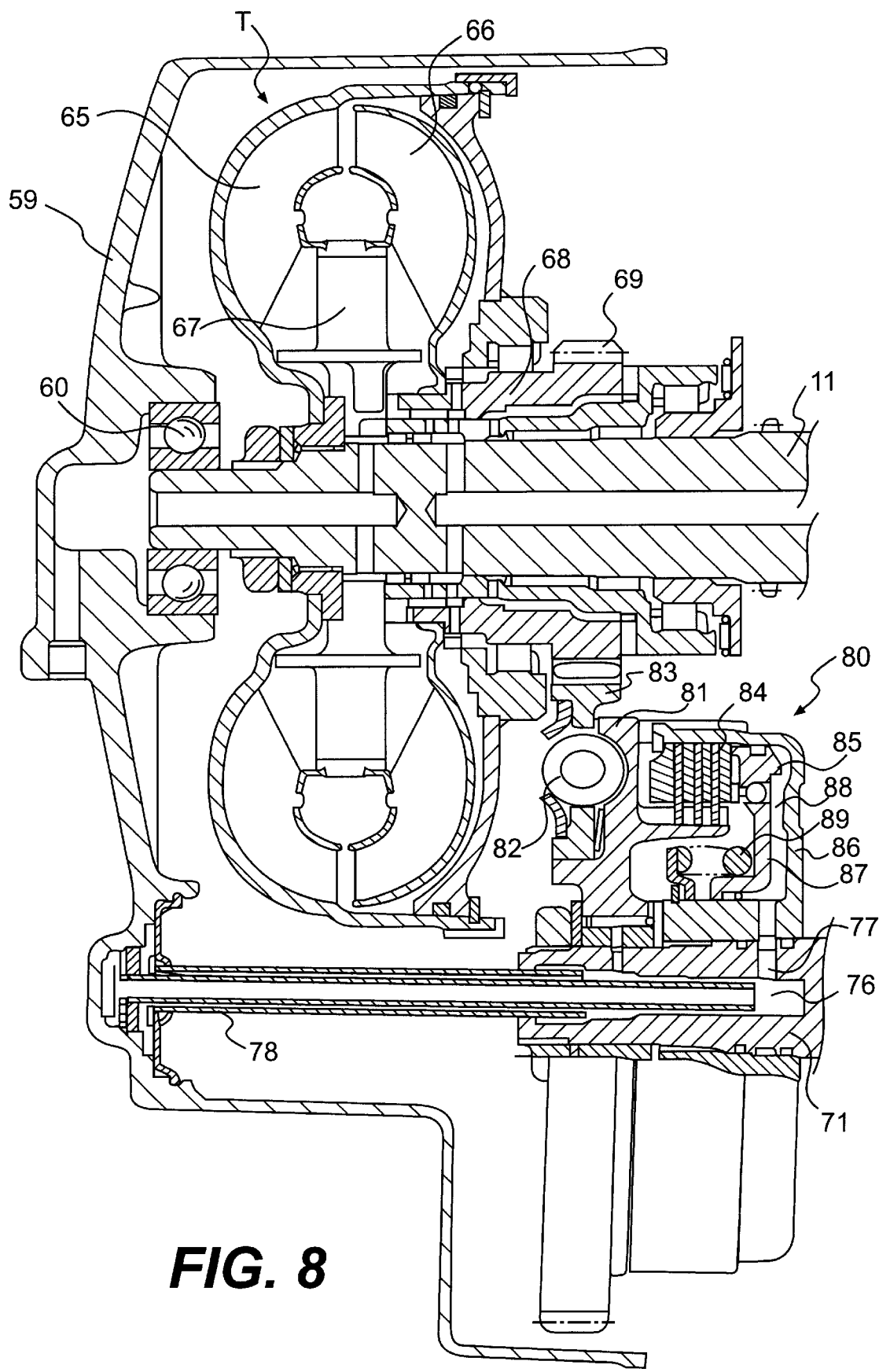
FIG. 8 is an enlarged view of a principal portion mainly concerned with a torque converter.
Figure 9:
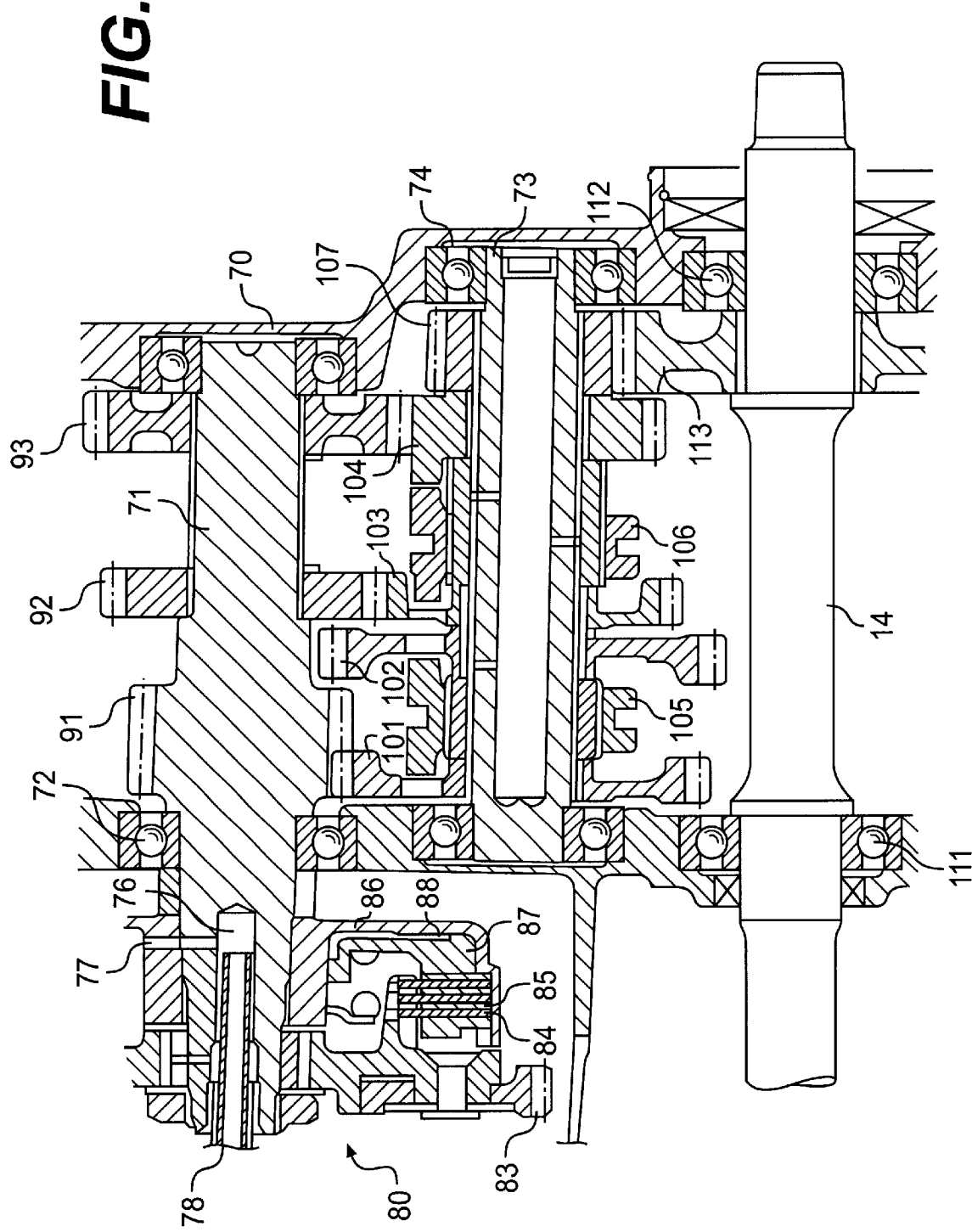
FIG. 9 is an enlarged view of a principal portion mainly concerned with a multi-stage transmission mechanism.
Figure 12:
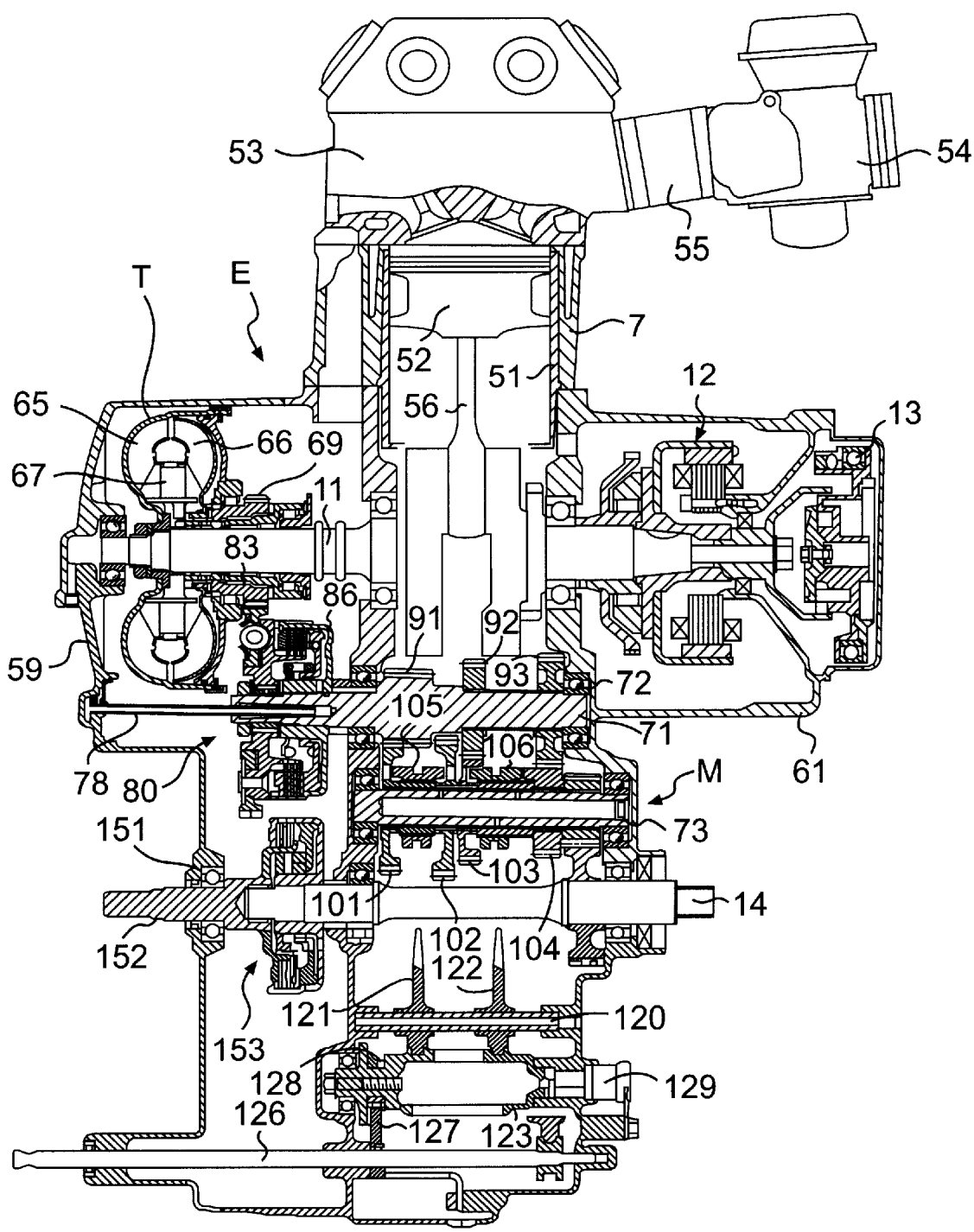
FIG. 12 is a sectional view showing another example of a power unit.

FIG. 12 is a sectional view similar to FIG. 7, showing another example of a power unit. In this example, a drive shaft 14 and a propeller shaft 152 are provided for the front wheels. The propeller shaft is rotatably supported through a ball bearing 151 by a front cover 59 extending upwardly to the front side of the transmission case 70. The propeller shaft 152 and the drive shaft 14 are connected together not through such a constant velocity joint as in the previous embodiments but through a clutch 153 adapted to turn ON and OFF the transfer of power.

When the clutch 153 is ON, power is transmitted to the propeller shaft 152 for the front wheels through the drive shaft 14. When the clutch 153 is OFF, the transfer of power to the propeller shaft 152 is cut off, so that the front wheels serve only as steering wheels.

According to the present invention, as set forth above, since a center line of a rotational axis of a torque converter and a longitudinal center line of a drive shaft which transfers the driving force from the transmission to front or rear wheels, are distributed right and left in an opposed relation to each other with respect to a longitudinal vehicular center line of a four-wheel vehicle for traveling on an irregular road such as a buggy, it is possible to improve the weight balance and hence possible to attain a high traveling stability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A four-wheel vehicle for traveling on an irregular road wherein a driving force of an engine is transmitted to front or rear wheels, comprising:

a torque converter operatively connected to a power transfer path extending from a crank shaft of said engine up to an input shaft of a transmission; and a center line of a rotational axis of said torque converter and a longitudinal center line of a drive shaft which transmits the driving force from said transmission to the front or rear wheels are disposed right and left in an opposed relationship to each other with respect to a longitudinal center line of a body of the vehicle, wherein said front and rear wheels are independent suspension type wheels, the driving force of the drive shaft is transmitted to the front wheels through a propeller shaft and a differential gear, and the center of said differential gear lies approximately on the center line of the body of the vehicle.

2. The four-wheel vehicle for traveling on an irregular road according to claim 1, and further including constant velocity joints operatively positioned between said differential gear and drive shafts for said front wheels.

3. The four-wheel vehicle for traveling on an irregular road according to claim 1, wherein said differential gear includes a ring gear with a pinion gear to said propeller shaft and being in mesh with said ring gear for imparting rotation thereto.

4. The four-wheel vehicle for traveling on an irregular road according to claim 3, and further including driving shafts secured to said rear wheels, said driving shafts being splined to a cylindrical member for adjusting the axial length thereof and a ring gear secured to said cylindrical member for engaging a pinion gear for imparting rotational motion thereto.

5. The four-wheel vehicle for traveling on an irregular road according to claim 1, and further including constant velocity joints for transferring rotation from a rear wheel propeller shaft to rear wheels of said four-wheel vehicle.

6. A four-wheel vehicle for traveling on an irregular road wherein a driving force of an engine is transmitted to front wheels, comprising:

a power drive shaft operatively connected to said engine for imparting rotary motion thereto;

a torque converter operatively positioned between said power drive shaft and a crank shaft of said engine up to an input shaft of a transmission; and a center line of rotation of said torque converter and a longitudinal center line of a drive shaft for transmitting the driving force from said transmission to the front wheels is disposed right and left in an opposed relationship to each other with respect to a longitudinal center line of a body of the vehicle, wherein said front and rear wheels are independent suspension type wheels, the driving force of the drive shaft is transmitted to the front wheels through a propeller shaft and a differential gear, and the center of said differential gear lies approximately on the center line of the body of the vehicle.

7. The four-wheel vehicle for traveling on an irregular road according to claim 6, and further including constant velocity joints operatively positioned between said differential gear and drive shafts for said front wheels.

8. The four-wheel vehicle for traveling on an irregular road according to claim 6, wherein said differential gear includes a ring gear with a pinion gear to said propeller shaft and being in mesh with said ring gear for imparting rotation thereto.

9. A four-wheel vehicle for traveling on an irregular road wherein a driving force of an engine is transmitted to rear wheels, comprising:

a power drive shaft operatively connected to said engine for imparting rotary motion thereto;

a torque converter operatively positioned between said power drive shaft and a crank shaft of said engine up to an input shaft of a transmission; and a center line of rotation of said torque converter and a longitudinal center line of a drive shaft for transmitting the driving force from said transmission to the rear wheels is disposed right and left in an opposed relationship to each other with respect to a longitudinal center line of a body of the vehicle, wherein said front and rear wheels are independent suspension type wheels, the driving force of the drive shaft is transmitted to the front wheels through a propeller shaft and a differential gear, and the center line of said differential gear lies approximately on the center line of the body of the vehicle.

10. The four-wheel vehicle for traveling on an irregular road according to claim 9, and further including constant velocity joints operatively positioned between said differential gear and drive shafts for said rear wheels.

11. The four-wheel vehicle for traveling on an irregular road according to claim 9, wherein said differential gear includes a ring gear with a pinion gear to said propeller shaft and being in mesh with said ring gear for imparting rotation thereto.

12. The four-wheel vehicle for traveling on an irregular road according to claim 11, and further including driving shafts secured to said rear wheels, said driving shafts being splined to a cylindrical member for adjusting the axial length thereof and a ring gear secured to said cylindrical member for engaging a pinion gear for imparting rotational motion thereto.

13. The four-wheel vehicle for traveling on an irregular road according to claim 11, and further including constant velocity joints for transferring rotation from a rear wheel propeller shaft to rear wheels of said four-wheel vehicle.

* * * * *